United States Patent Office 3,030,297
Patented Apr. 17, 1962

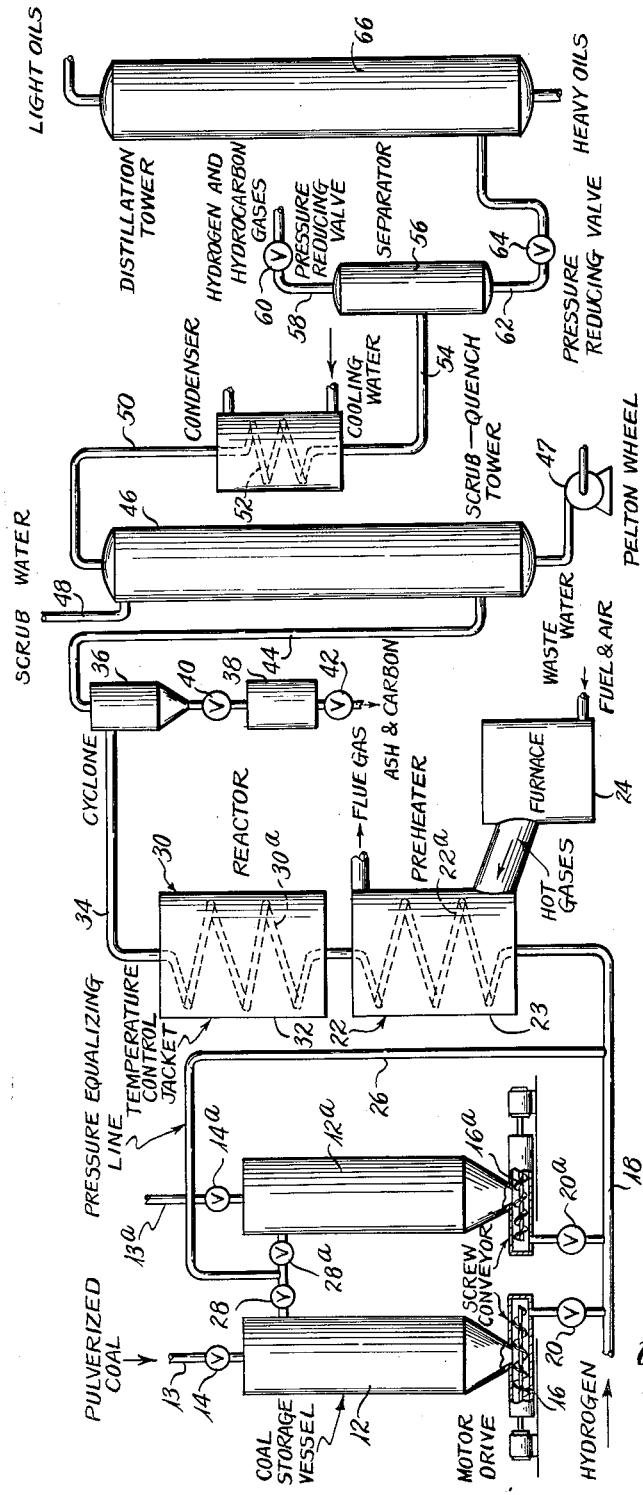

3,030,297
HYDROGENATION OF COAL
Wilburn C. Schroeder, College Park, Md., assignor to Fossil Fuels, Inc., a corporation of Delaware
Filed Mar. 11, 1958, Ser. No. 720,684
10 Claims. (Cl. 208—8)

This invention relates to a method for the rapid hydrogenation of coal to produce hydrocarbon liquids and gases and, particularly, to such a process wherein the liquid fraction produced is predominantly aromatic in nature. The process differs from and is superior to those known up to the present time for coal hydrogenation in that the reaction between the coal and hydrogen is completed in a period of time of two minutes or less; the hydrogen pressure may be varied over a range from about 500 to 6000 p.s.i.g. with satisfactory results; the conversion of carbonaceous matter in the coal to liquid and gases is substantially complete, it being possible to convert over 90% of the carbonaceous matter of the coal to liquid and gases in less than two minutes reaction time; the process can be so operated that the liquid product contains about 90% single-ring aromatic compounds, naphthalene and derivatives thereof; the consumption of hydrogen is near the minimum theoretical amount required for production of the liquid compounds; the ratio of gas to liquid fractions in the product can be controlled; the hydrogenation can be carried out in the presence or absence of a caatlyst; the products obtained from the process are readily separable from coal ash or any solid material; and the products are of simple composition and are readily separable by distillation or other conventional chemical or petroleum refining processes into commercial chemicals such as benzene, toluene, xylene, naphthalene, gasoline and oils, and hydrocarbon gases.

In coal hydrogenation processes as practiced in Europe and Great Britain, the coal to be hydrogenated was mixed with oil produced in the process to provide a slurry or paste, a catalyst such as a compound of tin, molybdenum, or iron was added, and the resulting mixture was then pumped to a pressure in the range of 3000 to 10,000 p.s.i.g., and put through a preheater along with hydrogen gas at this same pressure, where the temperature was raised into the range 460 to 500° C. From the preheater the mixture of coal, oil, catalyst and hydrogen flowed to a large vessel called a hydrogenation converter where the mixture was allowed to soak at temperatures around 480° C. for periods ranging from 15 minutes to over an hour to complete the hydrogenation reactions. Additional high-pressure hydrogen gas was introduced into the mixture in the converter to provide the hydrogen needed, to stir the reacting mass, and to control the temperature.

At the finish of the soaking period the reacted mass consisting of a mixture of gas, liquid, and solid flowed into a vessel where the gases and volatile liquids were separated from the nonvolatile or heavier oils and solids. The gases and volatile liquids were taken off overhead. Part of these liquids after condensation and separation were ready for use as gasoline and oil, the remaining had to go through a second stage of hydrogenation to produce commercially desirable products.

The mixture of heavy oil and remaining solids of unreacted coal and ash were withdrawn from the pressure vessel, were centrifuged, steam distilled or otherwise treated to separate the oil from the undesired solids and some of the oil was then returned to the beginning of the process to be mixed with fresh coal and reprocessed in the operation. The remaining heavy oil was further hydrogenated in another step to make useful commercial products.

From a ton of bituminous coal fed to the process the yield of gasoline and oil was about 1000 lbs. and the yield of hydrocarbon gas 250–300 lbs. Hydrogen consumed in producing these products was over 200 lbs. In order to produce this hydrogen, to compress it and provide the steam and electrical energy for the rest of the plant, in excess of another ton of coal was used so that the net yield on the basis of total coal to the plant was less than half the values shown.

It is obvious that this process has many technical and economic disadvantages. Among these are the following: the need for operating at extremely high pressures; the use of large amounts of hydrogen which are costly to produce and compress; the long time required for completion of the reaction; the difficulty of mixing coal and oil and of pumping a solid-liquid mixture to high pressures; the difficulty of separating the heavy oil product from the unreacted coal and ash; the need to recycle large amounts of heavy oil back through the process; the need to follow the first stage of hydrogenation by a second stage to produce finished products; the necessity for using a catalyst; and the fact that the process cannot be operated at temperatures appreciably above 500° C.

The primary object of the present invention is to provide a method which does not encounter these difficulties and which provides a basically different and high-value liquid product.

The invention involves several important new concepts including the method of heating the coal, the method of controlling the chemical composition of the liquid product, the method of controlling the ratio of liquid to gaseous product, and the method of minimizing the hydrogen used in the production of liquid product. Briefly, the process of the invention comprises heating dry particles of coal entrained in a stream of hydrogen at a total pressure of about 500 to 6000 p.s.i.g. from a temperature below about 300° C. to a reaction temperature in the range of from about 600° C. to about 1000° C. in a period of time of not more than about five minutes and preferably in less than two minutes, then immediately cooling the products of reaction below reaction temperature to provide a product comprising light oil—predominately aromatic in nature—and hydrocarbon gases— primarily methane.

Prior to this invention, attention had not been directed to the rate at which the coal particles were brought to the hydrogenation temperature as one of the controllable and important variables in the hydrogenation process. It is well known that coal consists mainly of a combination of carbon and hydrogen along with other elements such as oxygen, nitrogen, sulfur, etc. The carbon is primarily combined in condensed ring structures of high molecular weight. By far the greatest portion of the carbon is present in the form of rings containing six carbon atoms, i.e. an aromatic ring structure. In coal, the aromatic carbon rings are frequently bound directly together to form larger clusters or they may be held together through such linkages as

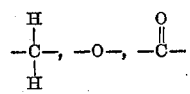

and others.

When coal is heated and reaches about 400° C. the solid structure begins to disintegrate and gas and condensable liquids are evolved. Depending on the rank of the coal and the rate of heating, this rearrangement of the coal structure continues up to 1000° C. or higher. As the gas and liquids, which are frequently called the volatile matter, leave the coal structure, the remaining solid material consolidates or polymerizes into coke or char, again depending on the rank of the coal. The coke or char thus produced is very difficult to hydrogenate, and even if it is eventually hydrogenated by exposure to the action of hydrogen at high temperature and pressure for a long time, the product is not liquid but is chiefly methane gas.

It is, of course, known that hydrogenation is accomplished more easily if the coal is prevented from consolidating into a coke or char during the heating period. It is for this reason that the coal in the known processes is usually dispersed in an oil and a catalyst is added to increase the speed of the hydrogenation reactions. It has also been proposed to hydrogenate dry particles of coal in a fluidized bed, but here again the particles have been heated for a relatively long period below temperatures of 600° C., resulting in slow hydrogenation, production of particles of coke or char, and a conversion of the coal of less than about 50%. To render the fluidized process practical with the reaction conditions heretofore utilized, it has been further proposed to use up the large amounts of residual char produced in the hydrogenation converter by passing it to a gasification zone for reaction with steam to produce a hydrogen-carbon monoxide mixture for Fischer-Tropsch synthesis. Moreover, the liquids produced by the hydrogenation are heavy oils containing a large proportion of undistillable asphaltic constituents.

I have now found that the hydrogenation and conversion of coal to distillable liquids and gas can be substantially completed in a very simple and economical manner if hydrogenation temperatures in the range of about 600° C. to 1000° C. are used and the heating period at temperatures above 300° C. is less than about five minutes. The preferred temperature is around 800° C. with a retention time of less than two minutes. Under these conditions hydrogen pressures from 500 to 6000 p.s.i.g. are satisfactory with or without a catalyst.

To bring the coal to the desired reaction temperature, e.g. 800° C., it must, of course, pass through the temperature range of 400 to 550° C. In this range the hydrogenation is slow and, as pointed out above, if the coal is heated slowly it will polymerize into coke and char which cannot be hydrogenated to liquids even at high temperatures. My experiments have shown that the coal must be heated to the high temperature range and preferably near 800° C. just as rapidly as possible. When the coal is heated from room temperature to 800° C. in two minutes under 6000 p.s.i.g. hydrogen pressure, more than 90% of the moisture- and ash-free materials are converted to liquid and gas. This heating rate is fast enough to prevent any extensive polymerization of the coal into coke or char which then becomes difficult to hydrogenate.

Attempts have been made to hydrogenate mixtures of coal and return oil from the hydrogenation process at temperatures above 500° C., i.e. in the range of 500 to 550° C., in hydrogenation converters such as used in Europe and in England. These have been unsuccessful because the hydrogenation as well as cracking reactions became so rapid and vigorous that the temperatures ran away in some cases became high enough to melt steel thermocouple wells and other metal equipment in the reaction space. At these high temperatures the oil and coal rapidly cracked down to carbonaceous solids and gas. The solids plugged the hydrogenation converter and thereby shut down the whole process.

My invention circumvents these runaway reactions, high temperatures, and plugging of the equipment; first, by eliminating the mixing of return oil with the coal; second, by high velocity flow through the reactor; and third, and even more important, by operating at temperatures which form aromatic and not paraffinic hydrocarbons. No heat is released when coal is hydrogenated to aromatic material, whereas there is a large heat release when coal is hydrogenated to saturated paraffins. While excess hydrogen may be present in the process of the invention, the residence time at reaction temperatures which would produce saturated hydrocarbons is so small that complete reaction to saturated paraffinic hydrocarbons does not take place.

I have found the composition of the product, especially the liquid product, from coal hydrogenation is dependent on the temperature at which the hydrogenation is carried out and the residence time at such temperature. Hydrogenation at 460 to 500° C. for a sufficient length of time produces a product which is a mixture of heavy oil with some lighter oils containing mainly saturated paraffins, and cycloparaffins. These compounds contain the maximum amount of hydrogen and the hydrogen consumption to convert the coal to these compounds is also about the maximum. Above 600° C. the saturated paraffins and cycloparaffins with the exception of methane, no longer tend to form. These compounds do not appear, or appear only in negligible amounts when hydrogenating at temperatures in the range of 600 to 1000° C. The compounds which do appear in the liquid product where the reaction time is sufficiently limited are materials such as benzene $C_6H_6$, toluene $C_6H_5(CH_3)$, xylene $C_6H_4(CH_3)_2$, naphthalene $C_{10}H_8$, and various derivatives or homologues. The gaseous product is essentially all methane with minor amounts of ethane and propane. The gases are, of course, mixed with unreacted hydrogen from the process. The liquid products from this high temperature hydrogenation contain generally one hydrogen atom for one carbon atom, whereas lower temperature hydrogenation produces material which contains three to four hydrogen atoms per carbon atom. The process of the invention, through the use of high temperatures and short reaction times to produce aromatic liquids reduces hydrogen consumption in the coal hydrogenation process by 50 to 75%.

In addition to reducing hydrogen consumption, the liquid aromatic product resulting from high temperature hydrogenation is a light oil which can be separated from ash and unreacted coal by settling, filtration, or distillation. In contrast, the heavy oil produced in low temperature hyrogenation cannot be distilled from the solid without loss of oil, nor can the solids be settled out.

The aromatic light oils produced in high temperature hydrogenation, in addition to being easily refinable by simple distillation, produce products which on today's markets have a very high value. In general, they are worth three to six times as much as the products from the oil produced in low temperature hydrogenation processes.

The retention time of the coal and reaction products in the heated zone of the hydrogenation reactor in the presence of hydrogen at the prevailing total pressure of 500 to 6000 p.s.i.g. is very important in controlling the amount of gases or liquids formed and in controlling the composition of the liquid product. The hydrogen pressure should initially be at least 500 p.s.i.g., since lower hydrogen pressure provides poor conversion of the coal to liquid and gases because there is insufficient reaction with hydrogen to prevent polymerization or solidification of the coal to coke or char. If the retention time at temperatures in the 400–600° C. range is too long at this hydrogen pressure, either before or after reaction in the 600–1000° C. range, the product will not contain the desired liquid fraction. For example, if the heating has been too slow in the 400–600° C. range to avoid coking and charring, further heating even at higher temperatures will form only methane. Likewise, if after the formation of aromatic liquid products, these products are retained at 400–600° C. for a substantial period of time, the aromatics may be further hydrogenated to form paraffins.

The average retention time for the gaseous and liquid products in the heated zone of the reactor at reaction temperature (600–1000° C.) should not be greater than about two minutes, and preferably should be between about 2 and 20 seconds, in order to produce the conversion of the coal to the desired liquid and gaseous components at a maximum conversion rate. Thus, the coal should be raised to a reaction temperature in the range of from 600° C. to 1000° C. in the presence of hydrogen at a pressure of from about 500 to 6000 p.s.i.g. as quickly as possible, preferably requiring less than two minutes; and the time period at a temperature of over 600° C. should desirably be not over 20 seconds, and preferably should be between about 2 and 20 seconds. Operation in this manner products a conversion of coal to liquid and gas of over 90%, with the liquid product being a light, aromatic, distillable oil and constituting as much as 30 to 60% of the weight of the moisture- and ash-free coal. If the retention time above 600° C. is too short, that is, below about two seconds, the conversion of the coal to liquid and gaseous components may still be good, but the liquid product may be a heavy material which requires further hydrogenation before it can be refined to commercial products.

In order to ascertain the proper process variables, experiments were carried out in a reactor comprising a stainless steel tube 5/16" inside diameter by 5/8" outside diameter by 70" long. A stainless steel, porous disk was positioned in an intermediate portion of the tube and a sample of coal was placed on this disk. The coal occupied a 6- to 20-inch length of the tube. Another porous, stainless steel disk was positioned at the other end of the column of coal. Where it was desired to add catalyst to the coal, this was accomplished by impregnating the coal with a solution of ammonium molybdate prior to placing it in the reactor. The reactor was heated electrically by means of electrodes placed at each end thereof, so that a current of from 400 to 700 amperes, at 9 to 10 volts, could be passed through the reactor. In this manner the reactor could be rapidly heated to high temperature. The stainless steel tube was connected to a source of hydrogen so that hydrogen could be passed through the column of coal and a back pressure regulator was provided so that a pressure of from 500 to 6000 p.s.i.g. could be maintained.

In the experiments, the hydrogen-flow rate through the reactor was varied from 20 to 228 standard cubic feet per hour. When hydrogen-flow conditions were at a steady rate through the reactor, the electrical circuit was closed to pass the high-ampere current through the reactor. In about two minutes the reactor could be brought from room temperature to 800° C. and in a slightly longer period, to 900 or 1000° C. The temperature range covered in the experiments was from 600 to 1000° C. When the desired temperature was reached, the current passing through the reactor was adjusted to maintain the temperature level for a period of time which in the experiments varied from 0 to 15 minutes. Zero (0) minutes indicates that the reactor was brought up to temperature and then immediately cooled. At the end of each selected time the current was cut off and the reactor was rapidly cooled by spraying water upon it.

Hydrogen gas and products issuing from the reactor were passed through an ice trap where those materials which were liquid at ice-bath temperatures were condensed and collected. At the end of each experiment any liquid remaining in the reactor itself was recovered and this material plus the material in the ice trap was calculated as the liquid product. The weight of this material less the weight of water present was taken as the liquid hydrocarbon product. The gases were passed through a rotameter and were all collected and measured in a gas holder. From analysis of the gas in this holder, the weight of hydrocarbon gas formed from the coal was determined. At the end of the run all solid material remaining in the reactor was weighed. This was used to determine the percent of coal converted to liquid and gas.

The coal used in the tests was a New Mexico coal of the following analysis:

|  | As charged | Moisture- and ash-free |
|---|---|---|
| Carbon | 72.12 | 78.3 |
| Hydrogen | 5.52 | 6.0 |
| Oxygen (by difference) | 12.16 | 13.2 |
| Nitrogen | 1.25 | 1.36 |
| Sulfur | 1.05 | 1.14 |
| Ash | 6.38 | |
| Moisture | 1.52 | |
|  | 100.00 | 100.00 |

The results of a number of experiments in the reactor described above are tabulated in Table I below. In the experiments reported in Table I, the pressure was 6000 p.s.i.g., the sample constituted 8 grams of coal on a moisture- and ash-free basis, and a catalyst constituting 1% molybdenum, on the basis of the moisture- and ash-free coal, was used. The percentages set forth in Table I and throughout the specification are on a percent-by-weight basis, unless otherwise indicated.

TABLE I

*Rapid Hydrogenation of Coal to Liquids and Gases at 600 and 800° C.*

| Test No. | Temp., ° C. | Time Above 300° C. (Min.) | Time at Max. Temp. (Min.) | Hydrogen Flow, Standard cu. ft. per/hr. | Based on moisture- and ash-free coal | | | Nature of oil |
|---|---|---|---|---|---|---|---|---|
| | | | | | Percent of coal converted | Percent liquid hydrocarbons formed | Percent hydrocarbon gas formed | |
| 1 | 600 | 2.9 | 1.0 | 20 | 67.6 | 15.1 | 32.6 | Heavy. |
| 2 | 600 | 2.3 | 1.0 | 20 | 66.1 | 16.2 | 26.7 | Do. |
| 3 | 800 | 2.0 | 0.0 | 20 | 73.1 | 9.9 | 37.2 | Light. |
| 4 | 800 | 3.0 | 1.0 | 20 | 67 | 13.8 | 41.2 | Do. |
| 5 | 800 | 2.5 | 0.0 | 50 | 83 | 23 | ¹40 | Very Light. |
| 6 | 800 | 2.5 | 0.0 | 100 | 90 | 39 | ¹40 | Do. |
| 7 | 800 | 1.7 | 0.0 | 100 | 88.4 | 48.9 | 31.8 | Do. |
| 8 | 800 | 1.8 | 0.0 | 100 | 85.0 | 38.8 | 39.6 | Do. |
| 9 | 800 | 2.5 | 0.0 | 228 | 94 | 31 | ¹35 | Very Heavy. |
| 10 | 800 | 2.5 | 0.0 | 228 | 97 | 39 | ¹42 | Do. |

¹ Estimated.

In the tests reported in Table I, the retention time of the products at reaction temperature was dependent on the rate of hydrogen flow as well as upon the time of quenching the reactor, i.e. at the lower rates of hydrogen flow a substantial portion of the liquid reaction products remainder in the reactor for the full period, but with the higher rates of hydrogen flow the liquid as well as the gaseous products were carried out of the reactor as formed. In one minute at 600° C. (Tests 1 and 2) about two-thirds of the coal was converted to hydrocarbon liquids and gases. The liquids formed were 15–16% of the m.a.f. (moisture- and ash-free) coal, and the hydrocarbon gases 26–33%. The remaining material to make up the 66–68% converted was $CO_2$, water, $NH_3$, $H_2S$, and minor amounts of other gases. The hydrogen flow rate during these tests was at the rate of 20 standard cubic feet per hour. About one-third of the liquid produced at 600° C. was distillable and highly aromatic in nature, the remaining fraction being a heavy oil.

The next two tests, 3 and 4, show that at 800° C. with "0" and one minute at maximum reaction temperature and with the same hydrogen flow rate the percent of coal converted increased slightly. The percent of liquid hydrocarbons decreased to around 10 to 15% and the hydrocarbon gas increased to about 40%. In these tests, however, the oil product was lighter than in tests 1 and 2, about one-half of the liquid product being distillable and high in aromatic components.

Test 5 was the same as 4, except that the rate of hydrogen flow was increased from 20 to 50 standard cubic feet per hour, so as to carry products of reaction out of the heated zone at a faster rate, and the time at maximum temperature was decreased from one minute to "0" minute. In spite of the decreased retention time, the percent of coal converted increased to 83% and the liquid hydrocarbons to 23%. Substantially all of the liquid product was a very light oil, distillable under atmospheric pressure and having a high proportion of aromatic constituents.

Test 6 was run under the same conditions as 5, except that the hydrogen flow was increased from 50 to 100 standard cubic feet per hour, thereby removing products of reaction from the heated zone at a still faster rate, i.e. further decreasing retention time. The percent of coal converted increased to 90 and the liquid yield to 39. The estimated gas yield remained at 40%. The oil was very light, high in aeromatics, and completely distillable.

In tests 7 and 8 the flow rate of hydrogen was again 100 standard cubic feet per hour, thus rapidly removing products of the reaction from the reactor. The total time above 300° C., however, was reduced to 1.7 minutes in test 7 and to 1.8 minutes in test 8. At the hydrogen flow rate of 100 standard cubic feet per hour, the retention time of the products at reaction temperature was about five seconds. With zero time at maximum reaction temperature, the percent total conversion remained high (85–90%) and the percentage conversion to liquid products was at a maximum for this series of tests. Moreover, the liquid product was a very light, completely distillable oil, high in aromatic constituents.

Tests 9 and 10 were duplicates and were at the same conditions as 6, except that the hydrogen flow was further increased to 228 standard cubic feet per hour. In these tests total conversion of the coal was well above 90%, hydrocarbon liquids formed were from 31 to 39%, and hydrocarbon gas 35 to 42%. However, the liquid was very heavy, being almost a tar in consistency. It is apparent from tests 9 and 10 that the hydrogen velocity had now become so high that the retention time for the products from the coal hydrogenation in the heated zone was too short to complete the conversion to light oils. At a flow rate of 228 standard cubic feet of hydrogen per hour, the retention time for the gases and liquids in the heated section of the reactor was calculated to be 2.3 seconds.

Table IA below show the results of tests for the hydrogenation of coal in the absence of all added catalysts. The test conditions, except where otherwise indicated, were the same as in test 6 reported in Table I.

TABLE IA

Rapid Hydrogenation of Coal to Liquids and Gases Without a Catalyst

| Test No. | Time above 300° C. (Minutes) | Time at Temp. (Minutes) | Percent of Coal Converted | Percent Liquid Hydrocarbons | Percent Hydrocarbon Gas Formed |
|---|---|---|---|---|---|
| 6-a | 1.6 | 0.0 | 73.4 | 31.4 | 38.9 |
| 6-b | 1.9 | 0.0 | 76.3 | 26.6 | 46.7 |

The liquid fraction was in the form of a light oil, high in aromatics.

It is apparent from Table IA that the rapid high temperature hydrogenation process proceeds satisfactorily with or without a catalyst.

Results of experiments conducted in the reactor described above, but at higher temperatures and lower hydrogen pressures, are tabulated as follows:

TABLE II

Rapid Hydrogenation of Coal to Liquids and Gases at 900 and 1000° C.

[Sample—8 grams of coal (weight on a moisture- and ash-free basis)]

[Catalyst—1% molybdenum on basis of moisture- and ash-free coal]

| Test No. | Temp, ° C. | Time Above 300° C. (Min.) | Time at Temp. (Min.) | Pressure, p.s.i.g. | Hydrogen flow, s.c.f./hr. | Based on moisture- and ash-free coal | | | Nature of oil |
| | | | | | | Percent of coal converted | Percent liquid hydrocarbons formed | Percent hydrocarbon gas formed | |
|---|---|---|---|---|---|---|---|---|---|
| 11 | 900 | 3.2 | 0 | 3,000 | 20 | 78.3 | 14.8 | 40.7 | Light. |
| 12 | 900 | 4.0 | 1 | 3,000 | 20 | 83.7 | 17.4 | 46.8 | Do. |
| 13 | 900 | 3.7 | 0 | 1,000 | 20 | 67.0 | 21.2 | 21.3 | Do. |
| 14 | 900 | 4.6 | 1 | 1,000 | 20 | 69.9 | 23.8 | 24.1 | Do. |
| 15 | 1,000 | 3.8 | 0 | 500 | 20 | 66.8 | 11.6 | 18.7 | Heavy. |
| 16 | 1,000 | 5.2 | 1 | 500 | 20 | 73.0 | 27.0 | 29.0 | Do. |

Table II shows the results of tests on the hydrogenation of coal at 900 and 1000° C. for hydrogen pressures between 3000 and 500 p.s.i.g. Tests 11 and 12 at 3000 p.s.i.g. show 78 to 84% coal conversion, with a 14 to 17% liquid yield and a 40 to 47% gas yield. When the pressure was decreased to 1000 p.s.i.g., as in tests 13 and 14, the conversion dropped to 67 to 70%, the liquid yield increased to 21 to 24%, and the yield of hydrocarbon gas was also in the range of 21 to 24%.

In tests 15 and 16 the temperature was increased to 1000° C. and the pressure decreased to 500 p.s.i.g. Under these conditions conversion was in the range 67 to 73%, liquid hydrocarbon yield from 12 to 27%, and gaseous hydrocarbons from about 18 to 29% and oil was fairly heavy. The products resulting from operating under these conditions are similar to those obtained by operating at the other end of the preferred range, i.e. at temperatures around 600° C. and pressure of about 6000 p.s.i.g. It will be apparent that best results are obtained in the 700° C. to 900° C. range.

Table III below shows a typical analysis of liquid products passing overhead from the reactor in tests conducted at 600 and 800° C.

TABLE III

*Analysis of Hydrocarbon Liquids Produced by the Hydrogenation of Coal*

| Test No. | Temp., °C. | Single-Ring Aromatics, Percent | | | | | Percent Naphthalene | Percent Unidentified |
|---|---|---|---|---|---|---|---|---|
| | | Benzene | Toluene | Xylene | Other single-ring aromatics $C_9$–$C_{10}$ | Total | | |
| A | 600 | 1.5 | 28.9 | 46.9 | 15.4 | 92.7 | 1.2 | 6.1 |
| B | 800 | 58.0 | 18.0 | 6.0 | 1.0 | 83.0 | 4.0 | 13.0 |

At 600° C. the total single-ring aromatics in the oil passing overhead from the reactor amounted to 92.7%, most of which was toluene and xylene. At 800° C. the same fraction showed 83% single-ring aromatics, most of which consisted of benzene and toluene. It is apparent that the higher temperature strips the side chains off the xylene and to some extent off the toluene to produce more benzene. This accounts for the 58% benzene in this product. It will be understood that the quantity of the liquid products having the analysis given above was greater at the 800° C. temperature than at the 600° C. temperature, representing substantially all of the liquid products formed at 800° C. but only about one-third of the total liquid products formed at 600° C.

It is apparent from Table III that hydrogenation of coal at temperatures of 600° C. and higher will produce an oil fraction which is highly aromatic and consists largely of mixtures of benzene, toluene, xylene, other single-ring aromatics and naphthalene. Further, the proportion of benzene to toluene and other aromatics can be controlled by an increase or decrease in temperature within the operable range. These compounds can be readily separated into individual chemicals by well-known distillation and other processing methods.

It is also apparent from Tables I through III that up to 90 percent of the coal can be converted to hydrocarbon liquids and gases with a time at reaction temperature not in excess of one minute and a total time of less than 5 minutes. By controlling the reaction temperature, hydrogen flow rate, and hydrogen pressure, the yield of products based on the m.a.f. coal can be varied from 4 or 5% hydrocarbon liquids up to about 60% and the yield of hydrocarbon gas from 20% up to about 50%.

Hydrogen consumption per ton of as-received coal will, of course, depend on the composition of the product produced. Hydrogenation operations conducted as in test 6 to produce a liquid hydrocarbon fraction having an analysis approximately as shown in the analysis B of Table III will consume about 70 pounds of hydrogen per ton of coal. If this coal were processed by the usual Bergius coal-hydrogenation method, it would use over 200 pounds of hydrogen per ton of coal. The reason for this, as noted heretofore, is that the aromatic liquids such as benzene contain only one hydrogen atom per carbon atom, whereas the paraffinic liquids contain from two to four hydrogen atoms per carbon atom. Oils produced from coal in the temperature range 600–1000° C. can contain essentially no paraffinic or saturated cyclic compounds, since these are unstable and will not form. Oils produced in the Bergius hydrogenation process at 480–500° C. will normally contain about 50 to 60% paraffinic material. It is this difference in the composition of the oil that makes it possible in the present process to hydrogenate the coal with low hydrogen consumption. The process may be operated by entraining coal particles in a hydrogen stream providing 120 to 200 pounds of hydrogen per ton of coal (moisture- and ash-free basis), i.e. the quantity of hydrogen is slightly in excess of that required to produce the desired aromatic products but may be less than that which would produce completely saturated compounds, e.g. methane. If desired, the entire hydrogen supply for conducting the reaction may be produced from the product gases by well-known catalytic reforming methods involving the reaction of the gaseous hydrocarbons with steam.

As an example of the commercial application of the invention to produce aromatic oils and hydrocarbon gases from coal, reference is made to the accompanying drawing wherein the sole FIGURE illustrates diagrammatically one form of apparatus for carrying out the process. The equipment consists of two closed coal-storage vessels 12 and 12a for the storage and feeding of pulverized coal. These vessels are capable of being maintained under high pressure and are filled with pulverized coal through inlet pipes 13—13a and valves 14—14a. The coal is fed alternately from either one or the other of the storage vessels 12—12a by a screw conveyor 16 or 16a into a pressurized hydrogen stream supplied to a pipe line 18 from a suitable source. Valves 20 and 20a are provided so that coal may be selectively withdrawn from either vessel 12 or 12a. The combined hydrogen-coal stream in line 18 passes into a preheater 22, which may comprise one or a plurality of tubes 22a provided with a jacket 23 heated by hot gases from furnace 24. A pressure-return line 26 connects line 18 to storage vessels 12—12a through valves 28—28a so as to equalize the pressures while coal is being fed.

From the preheater 22 the hydrogen-coal stream passes to a reactor 30, which may comprise one or more tubes 30a provided with a temperature-control jacket 32, so that the temperature of the reactants can be maintained at the desired value. All of the gases, vapors, and solids leaving the reactor 30 pass through pipe 34 into a cyclone 36 where the major amounts of any remaining coal and ash are separated from the gases and vapors. The cyclone 36 is equipped with a receiver 38 provided with valves 40 and 42, which allow the intermittent removal of solids from the system without interference from the gas flow. The gases and vapors from the cyclone 36 pass through pipe 44 to a scrub-quench tower 46 where a spray of water is introduced through line 48 to lower the temperature to at least about 250° C. The quench tower 46 is positioned as close as possible to the reactor 30 to rapidly lower the temperature of the gases and vapors issuing therefrom, to prevent further hydrogenation which may destroy the valuable liquid products. The water in tower 46 absorbs acid gases such as hydrogen sulfide and carbon dioxide, and also absorbs any ammonia formed. The water leaving the bottom of tower 46 is dropped in pressure through Pelton wheel 47 and after release of dissolved gases and separation of any oils and tar may be cooled and recycled for further use in tower 46.

After the gases and vapors have been quenched in tower 46, they pass through pipe 50 to a condenser 52 where they are further cooled indirectly by heat exchange with water or other cooling fluid to condense out the liquid hydrocarbons. The resulting gas-liquid mixture passes through pipe 54 to a separator 56 from which gases are taken off the top through pipe 58 and pressure-release valve 60, and liquids are drawn off the bottom through line 62. The liquids are then passed through pressure-reducing valve 64 to a distillation tower 66 where they can be fractionated into the desired higher and lower boiling liquid fractions.

The preheater tubes 22a and the reactor tubes 30a are constructed from any suitable material capable of withstanding the high temperatures and pressures. Heat-resistant alloy steel has been found satisfactory. The tubes preferably have a relatively small inside diameter, so as to enable the contents to be rapidly and uniformly heated. The velocity of flow of gas-entrained coal therethrough is relatively high, thereby preventing adherence of coke or char to the sidewalls and clogging of the coil. Tubes having an inside diameter of one inch or less are satisfactory, the necessary retention time being controlled by the length of the tube and the velocity of flow. The tubes may be either straight or in the form of coils, as desired, and a number of such tubes may be disposed in parallel arrangement within the heating and temperature-control jackets. It will be understood that the number of tubes is dependent upon the desired capacity of the system. Tubes of larger diameter may also be used. However, in any case, the flow rate should be sufficient to move the entrained solids at about the same rate as the gases.

EXAMPLE

For the purposes of this example it will be assumed that 300 pounds (on a moisture- and ash-free basis) of New Mexico coal will be hydrogenated per minute in the system described in the drawing, at 800° C. and 6000 p.s.i.g., to produce 150 pounds of liquid product and 3600 standard cubic feet of mixed hydrocarbon and hydrogen gases. To operate under the conditions selected for this example, coal storage vessels 12 and 12a are charged from the top with coal pulverized to a suitable size, such as 70% through 200 mesh. Coarser or finer particles can be used if desired, but the maximum size should be such as to freely pass through the preheat and reactor coils. About 100-mesh or smaller particle size is generally satisfactory. Valves 20 and 28 are opened to connect vessel 12 to the hydrogen line 18 and valve 14 is closed. Vessel 12a is isolated from the hydrogen line 18 by keeping valves 20a and 28a closed. Hydrogen gas is then brought through line 18 and the entire system pressurized to 6000 p.s.i.g. With hydrogen flowing through the system at the rate of 21.3 pounds per minute, furnace 24 is started and is operated at a rate that feeds 300 lbs. of moisture- and ash-free coal per minute to the hydrogen stream in line 18 (130 lbs. hydrogen per ton of as-received coal). Vessel 12 is of such a size that it will provide coal for at least 15 to 20 minutes. When the coal in this vessel is depleted, vessel 12a is then put in the line to feed coal and vessel 12 is reloaded. These two vessels, 12 and 12a, used alternately, provide a continuous and controlled coal feed to the process. Pressure equalizing line 26 keeps a balanced pressure on both sides of the feed vessel so that the feed screw does not have to operate against a pressure differential.

The coal-hydrogen stream which now contains 8 lbs. of entrained coal per cubic foot of hydrogen at the operating conditions, passes through preheater 22 to be preheated. The gas velocity in the tubes of preheater 22 is calculated at 15 to 20 feet per second. It will be understood that lower or higher gas velocity may be used, provided the gas velocity is such that the coal particles will move substantially at the same rate as the gas stream. The calculated retention time of the coal particles in preheater 22 is less than approximately a minute, the stream reaching a temperature of about 600° C. in this time. The temperature attained in the preheater tube 22 should be at least sufficient to initiate the conversion of the coal to the desired products. From preheater 22 the gas-solid stream flows to reactor 30. As the result of the formation of some methane in reactor 30, the temperature of the gases will rise about 150 to 200° C. as they pass through the reactor is about five feet per second and the retention time in the reactor also is less than about one minute.

The products from the hydrogenation reaction, which consist of a mixture of gases, vaporized liquids, ash and any unreacted coal, then pass from reactor 30 to cyclone 36, where a major portion of the solid material (mainly ash) is separated. This solid is discharged from the pressure system at intervals through valved receiver 38. Gases and vaporized liquids are then quenched in scrub-quench tower 46 by spraying water into the stream to lower the temperature to around 250° C. This will retard further hydrogenation reactions which may destroy valuable aromatic liquid products.

The products are then further cooled in condenser 52 to temperatures in the range of 25–50° C. to condense the vaporized liquids in the gas stream. From condenser 52 the product, which is now a mixture of gases and liquids, goes to separator 56, which is a vessel in which the liquids separate from the gas. The gases are taken off the top through a pressure-reducing valve 60 at the rate of about 3600 standard cubic feet per minute. The composition of the gas in volume percent is about 40% $CH_4$, 5% $C_2H_6$, 1% $C_3H_8$ and 50% $H_2$, with small amounts of CO, $CO_2$, $N_2$ and other impurities. The heating value of the gas is approximately 600 B.t.u. per cubic foot. It can be purified to remove $NH_3$, $CO_2$, and $H_2S$ and is then suitable for a wide variety of industrial purposes. Since the gas already contains nearly half hydrogen, it is very useful for the production of hydrogen for making ammonia, methanol, and other chemicals.

The product gas can also be used to furnish the hydrogen for use in the hydrogenation process itself and it is in excess of the actual requirements. Where the gas is to be used for this purpose, it may be mixed with steam and passed through a catalytic reforming unit where the steam and hydrocarbon gases react to form $H_2$, CO and a small amount of $CO_2$. Further steam is then added to this product and it is passed over a suitable catalyst to produce a further reaction between the CO and steam to furnish more $H_2$ and convert the CO to $CO_2$. After removal of the $CO_2$ a relatively pure hydrogen stream is available for the coal-hydrogenation process.

Other well-known methods are available for converting the product gases from the coal hydrogenation process to hydrogen, such as by partial oxidation with oxygen, and may be used where the economics at the particular plant so dictate.

The liquid products from separator 56, amounting to approximately 21 gallons per minute, are passed through a pressure-reducing valve 64 and may then go directly to the distillation tower. The composition of the liquid product comprises benzene, toluene, xylene, light oils in the gasoline range, naphthalene, heavier oil.

It is to be understood that this is a single example set forth to illustrate the application of the invention and that the conditions selected represent only one suitable combination. Other conditions within the operable ranges already specified may be used to produce other products as previously set forth. Also, the particular apparatus and arrangement as shown in the drawing are for the purposes of illustration only. Numerous other arrangements and items of equipment which can be used to effect the purposes of the invention will be apparent to those skilled in the art.

I claim:
1. A process for the hydrogenation of coal, comprising: contacting substantially dry coal having a particle size below about 100 mesh, in the absence of added oil, with hydrogen-containing gases at a temperature between about 600 and 1,000° C. and at a pressure of about 500 to 3,000 p.s.i.g. to produce distillable hydrocarbon liquids and gases, the total time of the coal-hydrogen mixture at temperatures above 300° C. being less than about two minutes including a reaction time of the mixture in said 600 to 1,000° C. temperature range of less than one minute.

2. The process as defined in claim 1 wherein said coal is provided with a molybdenum hydrogenation catalyst.

3. The process as defined in claim 1 wherein said coal and hydrogen-containing gases are passed concurrently through a reaction zone maintained in said temperature and pressure ranges to effect the hydrogenation reaction and the reaction products from said zone are immediately passed through a cooling zone and separated into gases, liquids and solids.

4. The process defined in claim 3 wherein the mixture of coal and hydrogen is heated to a temperature of about 800° C. in said reaction zone.

5. The process defined in claim 1 wherein the ratio of hydrogen to coal is at least sufficient theoretically to produce benzene from all of said coal but is insufficient theoretically to convert all of said coal to methane.

6. The process defined in claim 3 wherein the linear velocity of flow of the mixture through the coal particles are entrained in a flowing stream of hydrogen and the reaction zone is such that the entrained solids move at about the same velocity as the gases.

7. A process for the rapid hydrogenation of coal, comprising: entraining pulverized coal in the absence of added oil having a particle size of less than approximately 100 mesh in a flowing stream of hydrogen at a pressure of about 500 to 3000 p.s.i.g., passing the resulting stream through a heating zone, raising the temperature of said stream in said heating zone from below 300° C. to a temperature within the range from about 600 to 1000° C. in a time period of less than about one minute, maintaining the temperature of the flowing stream in said range for a time period of about two to about 20 seconds, then immediately cooling the stream of reaction products, and recovering a liquid hydrocarbon fraction containing a major proportion of single-ring aromatic compounds.

8. The process of claim 7 wherein the temperature is maintained in the lower portion of said temperature range to produce a liquid hydrocarbon fraction containing a major proportion of toluene and xylene.

9. The process of claim 7 wherein a temperature of at least about 800° C. is maintained so as to produce a liquid fraction containing a major proportion of benzene.

10. A process for the rapid hydrogenation of coal, comprising: entraining particles of coal in the absence of added oil having a particle size of less than about 100 mesh in a hydrogen-rich stream at the rate of about one ton of coal on a moisture- and ash-free basis per 100 to 200 pounds of hydrogen, passing the resulting suspension at a pressure of about 500 to 3000 p.s.i.g. through an elongated heating tube at a velocity sufficient to move the entrained solids at about the same rate as the gases, heating said suspension in said tube to a reaction temperature within the range of 600 to 1000° C. in less than about one minute, passing said heated suspension through an elongated heat-insulated reaction tube in a period of time of less than about one minute while maintaining the reaction temperature in said range, passing the product stream from said reaction tube to a separator and removing solid constituents therein, passing the resultant stream through cooling and condensing zones and thereby separating liquid from gaseous components.

References Cited in the file of this patent

UNITED STATES PATENTS

| | | |
|---|---|---|
| 2,753,296 | Sellers | July 3, 1956 |
| 2,860,101 | Pelipetz | Nov. 11, 1958 |
| 2,913,388 | Howell et al. | Nov. 17, 1959 |